United States Patent
Origane

Patent Number: 6,112,648
Date of Patent: Sep. 5, 2000

[54] TOASTER CAPABLE OF TOASTING SLICE OF BREAD WITH PATTERN ON SURFACE THEREOF

[75] Inventor: Masaaki Origane, Kadoma, Japan

[73] Assignees: Sanyo Electric Co., Ltd., Moriguchi; Sanyo Home Tech Co., Ltd., Kyoto, both of Japan

[21] Appl. No.: 09/344,245

[22] Filed: Jun. 25, 1999

[30] Foreign Application Priority Data

Jun. 29, 1998 [JP] Japan .................................. 10-182583

[51] Int. Cl.[7] .................................................... A47J 37/08
[52] U.S. Cl. ............................... 99/388; 99/391; 99/393; 99/385
[58] Field of Search .................................. 99/329 P, 385, 99/388, 389, 391, 393

[56] References Cited

U.S. PATENT DOCUMENTS

| | | | |
|---|---|---|---|
| 2,483,669 | 10/1949 | Reid | 99/388 X |
| 5,156,637 | 10/1992 | Wai-Ching | 99/391 X |
| 5,647,270 | 7/1997 | Rousseau et al. | 99/391 X |
| 5,664,481 | 9/1997 | Huggler | 99/391 X |
| 5,943,948 | 8/1999 | Tanaka | 99/391 X |

*Primary Examiner*—Reginald L. Alexander
*Attorney, Agent, or Firm*—Armstrong, Westerman, Hattori, McLeland & Naughton

[57] ABSTRACT

In a toaster, when a supporting member on which a sliced bread is placed is moved down to hold the sliced bread in a bread holding space, a pressing member almost straightly keeps and presses the sliced bread toward the plate heater with a pattern plate in conjunction with a downward movement of the supporting member. When heating is started, radiation heat from the plate heater to the sliced bread is shielded by the pattern plate attached to the plate heater. Thus, the sliced bread is toasted with a pattern in the shape of the pattern plate, and a peripheral region of the pattern plate is almost uniformly browned by radiation heat from the plate heater.

12 Claims, 8 Drawing Sheets

TOASTER CAPABLE OF TOASTING SLICE OF BREAD WITH PATTERN ON SURFACE THEREOF

BACKGROUND OF THE INVENTION

1. Field of the Invention

The present invention relates to pop-up toasters. More particularly, the present invention relates to a toaster capable of toasting a slice of bread with a pattern in a shape of animal, flower or the like on the surface thereof.

2. Description of the Background Art

Generally, a pop-up toaster is exclusively used for toasting a sliced bread. In the pop-up toaster, the sliced bread is inserted from the open top of the case.

Today, a certain type of toaster is available in which a sliced bread with a different thickness can be toasted.

In this type of toaster, for example, a width of a slot for insertion and removal of a sliced bread in the case and a distance between a pair of plate heaters in the case, that is, a bread holding space, correspond to the thickest sliced bread.

In the above described toaster, however, as the bread holding space between the two plate heaters corresponds to the thickest sliced bread, in toasting the thinnest sliced bread, for example, such sliced bread may be inclined in the bread holding space. Then, the upper half of the sliced bread on one side may be excessively heated, but the lower half insufficiently heated. On the other side of the sliced bread, the upper half may be insufficiently heated, while the lower half is excessively heated. Thus, the sliced bread may not uniformly be toasted.

The present inventor has proposed a toaster such as that described above in which a pattern plate in the shape of animal, flower or the like is attached on an inner side of one plate heater, so that a sliced bread can be toasted with a pattern corresponding to the shape of the above described pattern plate.

As described above, in this type of toaster, if the sliced bread is inclined when toasting the thinnest sliced bread, the uneven space is formed between the pattern plate and the sliced bread, and radiation heat from the plate heater is likely to transfer to the space. As a result, the sliced bread is not toasted with a clear pattern corresponding to the shape of the pattern plate, whereby a fuzzy pattern is formed.

SUMMARY OF THE INVENTION

Therefore, an object of the present invention is to provide a toaster capable of toasting a slice of bread by a heater regardless of a thickness of the sliced bread.

Another object of the present invention is to provide a toaster capable of uniformly toasting even a thin slice of bread.

Still another object of the present invention is to provide a pop-up toaster capable of toasting a slice of bread with a clear pattern corresponding to a shape of a pattern plate on the surface thereof even when a thin slice of bread is toasted.

The above described objects of the present invention can be achieved by a toaster having the following elements.

The toaster according to the present invention includes: a case having a slot at the top for insertion and removal of a sliced bread; at least a pair of plate heaters provided in parallel in the case to form a shape for holding the sliced bread; a supporting member vertically movably provided in the bread holding space between the plate heaters for supporting the sliced bread; and a pressing member pressing the sliced bread toward one plate heater when the sliced bread is supported by the supporting member and held in the bread holding space.

The sliced bread is pressed toward one heater by the pressing member. As the sliced bread is pressed toward one heater, it is kept in parallel to the heater during toasting. As a result, the sliced bread can be uniformly browned by the heater regardless of its thickness.

According to another aspect of the present invention, a toaster includes: a case having a slot at the top for insertion and removal of a sliced bread; at least a pair of plate heaters spaced apart almost in parallel in the case to form a bread holding space; a supporting member vertically movably provided in the bread holding space between the plate heaters for supporting the sliced bread; a pattern plate attached on an inner side of one plate heater for partially shielding radiation heat from the plate heater; and a pressing member pressing the sliced bread toward the plate heater with the pattern plate in conjunction with a downward movement of the supporting member.

When the supporting member on which the sliced bread is placed is moved down and the sliced bread is held in the bread holding space, the pressing member such as a movable guard is inclined in conjunction with the downward movement of the supporting member, so that the pressing member moves the sliced bread straightly toward the plate heater with the pattern plate. When heating is started, radiation heat from the plate heater is shielded by the pattern plate attached to the plate heater, whereby the sliced bread is browned with a pattern in the shape of the pattern plate. For a region of the sliced bread other than the pattern (hereinafter referred to as a peripheral region), radiation heat from the plate heater is almost uniformly applied to the surface of the sliced bread for toasting.

Thus, as the thin sliced bread is straightly pressed toward the plate heater with the pattern plate in the bread holding space between the pair of plate heaters, a clear pattern in the shape of the pattern plate is formed and the peripheral region can uniformly be toasted.

According to still another aspect of the present invention, a toaster includes: a case having a slot at the top for insertion and removal of a sliced bread; at least a pair of plate heaters spaced apart almost in parallel in the case to form a bread holding space; a supporting member vertically movably provided in the bread holding space between the plate heaters for supporting the sliced bread; guards each provided on an inner side of the plate heater for preventing direct contact of the sliced bread with the inner side of the plate heater; a pattern plate attached to one guard for partially shielding radiation heat from the plate heater on the side of the guard. The other guard is a movable guard which is inclined with a lower end thereof as a supporting point in conjunction with a downward movement of the supporting member for pressing the sliced bread toward the guard with the pattern plate.

The guard for the plate heater is used as the pressing member for pressing the sliced bread. As the guard is preliminary provided, additional parts are not necessary.

Preferably, the movable guard is formed of a single wire which is bent in a prescribed shape, and a supporting point thereof is attached to the plate heater in a twisted state. The movable guard is held close to the corresponding plate heater by its own twisting spring force when the supporting member is on the upper side, and inclined against the twisting spring force to be closer to the guard with the pattern plate in conjunction with a downward movement of the supporting member.

Since the movable guard in a single wire is provided as the pressing member with its supporting portion for the plate heater in a twisted state, the movable guard can be brought back to its original position by its own twisting spring force as the supporting member moves upward. Thus, any additional part such as a twisting spring for bringing the guard to the original position is not necessary, so that increase in a cost can be avoided.

According to still another aspect of the present invention, a toaster includes: a case having a slot in the top for insertion and removal of a sliced bread; at least two plate heaters spaced apart almost in parallel in the case for forming a bread holding space; a supporting member for a sliced bread vertically movably provided in the bread holding space between the plate heaters; and guards each provided on inner sides of the plate heater for preventing direct contact of the sliced bread with the inner sides of the plate heater. At least one guard is formed of a single wire which is bent in a prescribed shape, of which lower portion is attached to the plate heater with its supporting point in a twisted state. The guard is a movable guard which is held close to the corresponding plate heater by its own twisting spring force when the supporting member is positioned on an upper side, and inclined to be closer to the other guard against its own twisting spring force in conjunction with a downward movement of the supporting member.

As the guard of the plate heater serves as the pressing member in a toaster without the pattern plate, a structure for pressing the sliced bread toward the plate heater can be simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will now be described in detail with reference to the drawings.

Figure 1:
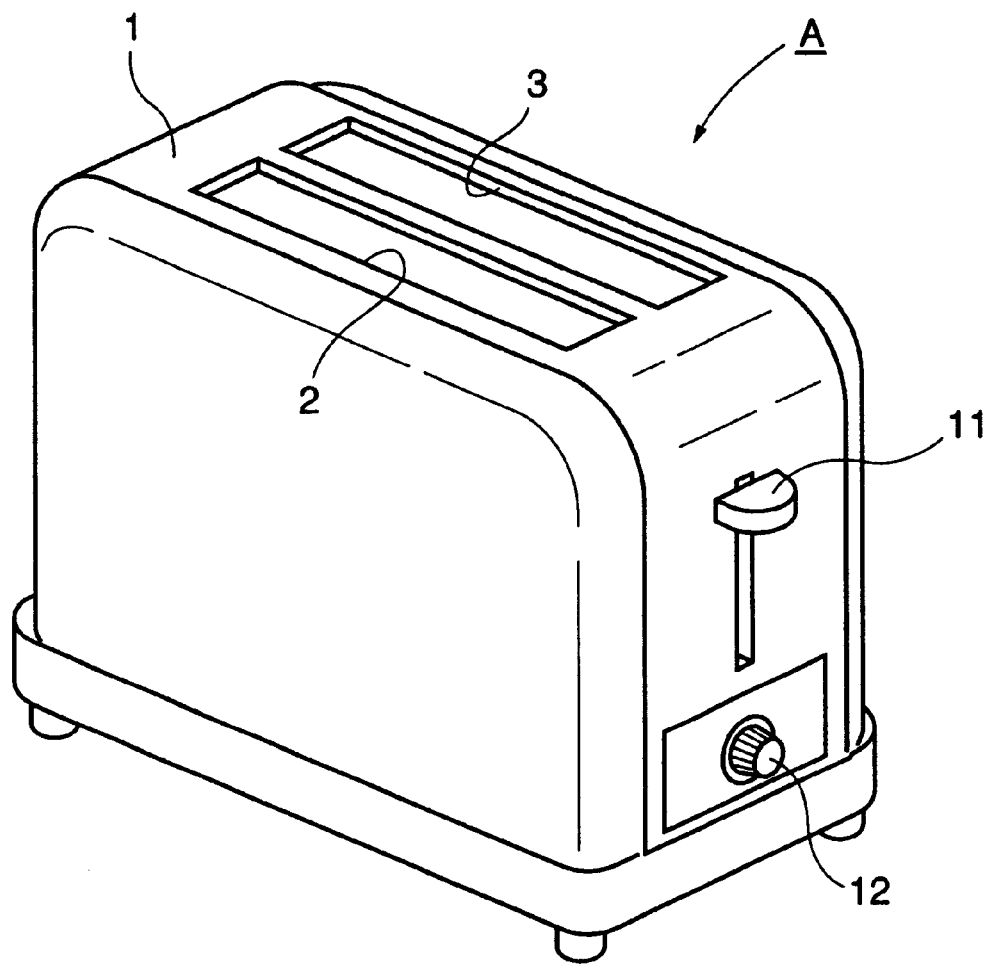
FIG. 1 is a perspective view showing a toaster according to one embodiment of the present invention.

Referring to FIG. 1, two slots 2 and 3 for insertion and removal of a slice of bread are laterally provided at the top of a case 1 of a toaster A. Each of these slots 2 and 3 is generally in a rectangular shape when viewed from above.

Figure 2:
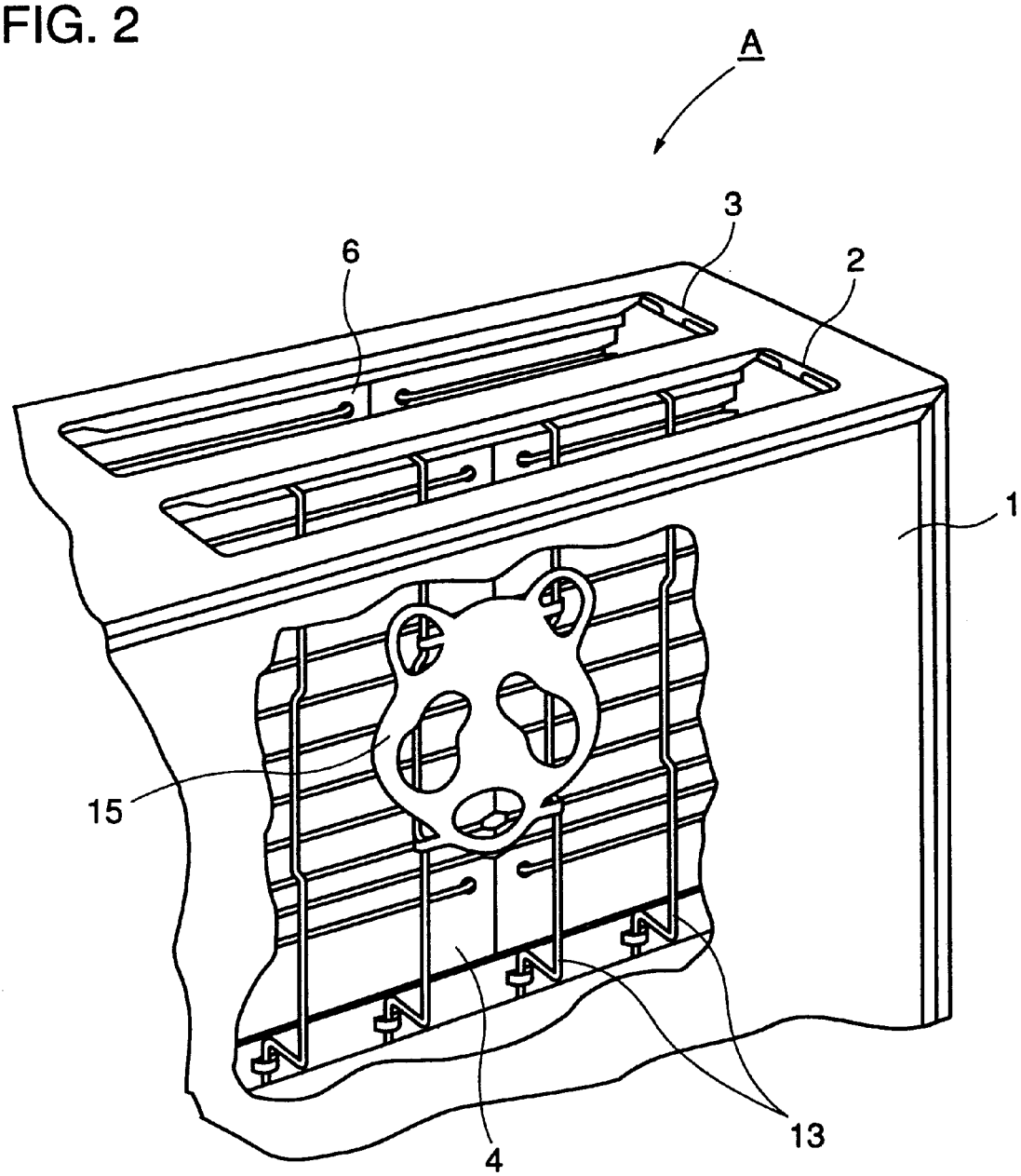
FIG. 2 is a partially cutout perspective view showing the toaster.
Figure 3A:
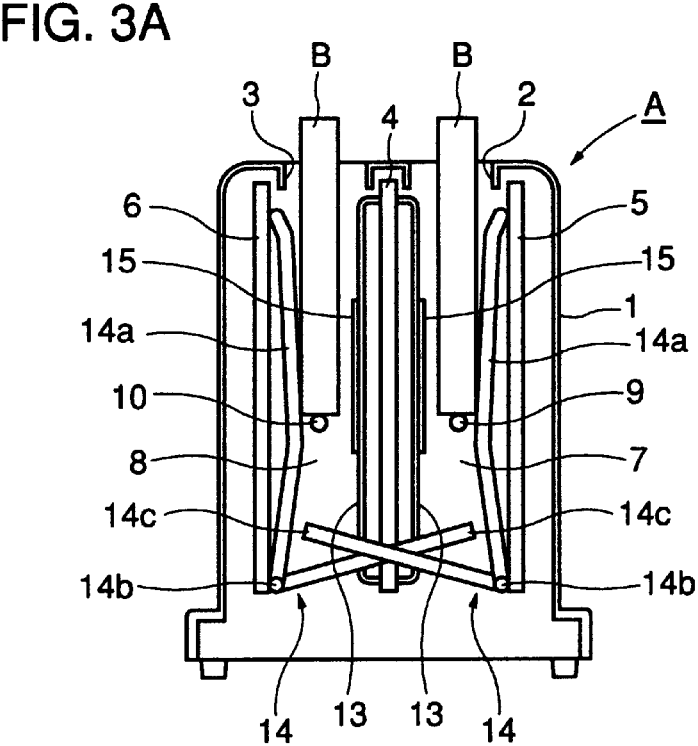
FIGS. 3A and 3B are side views showing an internal structure of the toaster.
Figure 3B:
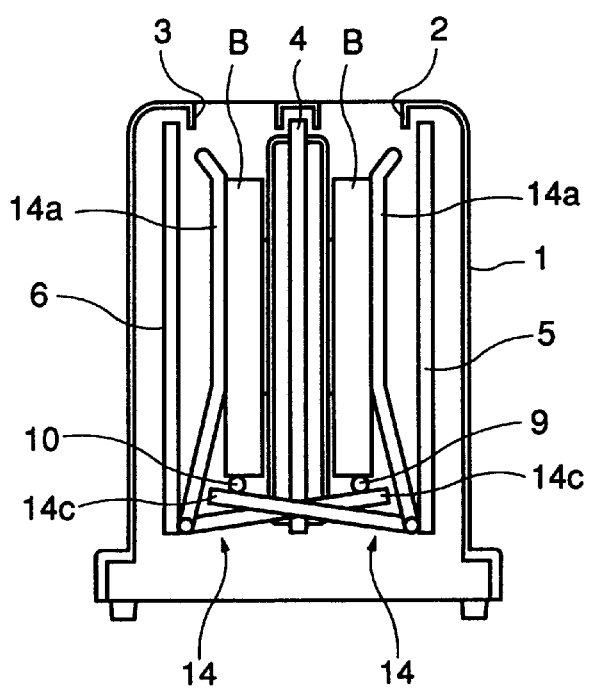

Referring to FIGS. 2, 3A and 3B, two sets of plate heaters 4, 5 and 6 are provided corresponding to slots 2 and 3 for insertion and removal of the sliced bread in case 1. Plate heaters 4, 5 and 6 are spaced apart by a prescribed distance almost in parallel to form two bread holding spaces 7 and 8 for holding the sliced bread. It is noted that first plate heater 4 in the middle and second plate heater 5 on one side are for toasting both sides of a sliced bread B held in bread holding space 7, whereas first plate heater 4 in the middle and third plate heater 6 on the other side are for toasting both sides of sliced bread B held in the other bread holding space 8.

Supporting bars 9 and 10 for supporting sliced bread B are vertically movably provided in bread holding spaces 7 and 8. One end of each of supporting bars 9 and 10 outwardly produces from one side of case 1, to which a single knob 11 (see FIG. 1) is attached. A user can vertically move supporting bars 9 and 10 by knob 11. When the supporting bar is moved down to a prescribed position, it is held by a holding mechanism (not shown) and allowed to move upward at the termination of a timer (not shown). It is noted that the above described timer is started by a toasting control knob 12 externally provided on one side of case 1.

Attached to the above described three plate heaters 4, 5 and 6 are two guards 13 and two guards 14 for preventing direct contact of sliced bread B with plate heaters 4, 5 and 6. More specifically, first plate heater 4 in the middle is provided with guards 13 on either side, whereas each of second and third heaters 5 and 6 on both sides is provided with guard 14 only on its inner side. Two guards 13 attached to first plate heater 4 have its upper and lower ends fixed, whereas guards 14 attached to second and third heaters 5 and 6 have their lower ends fixed, but are generally adapted to be inclined using the lower ends as supporting points. Guards 13 for first plate heater 4 and guards 14 for second and third plate heaters 5 and 6 are respectively referred to as fixed guards and movable guards. Each of these guards 13 and 14 are formed by bending a single wire or the like at upper and lower portions.

Figure 4:
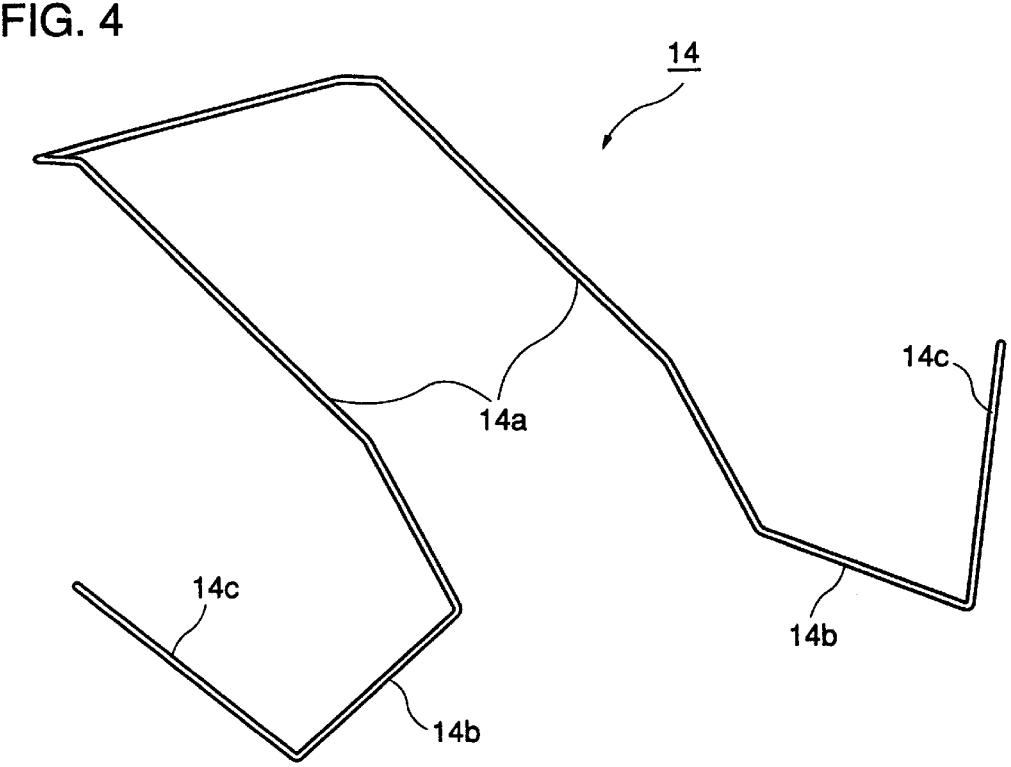
FIG. 4 is a perspective view showing a movable guard.
Figure 5:
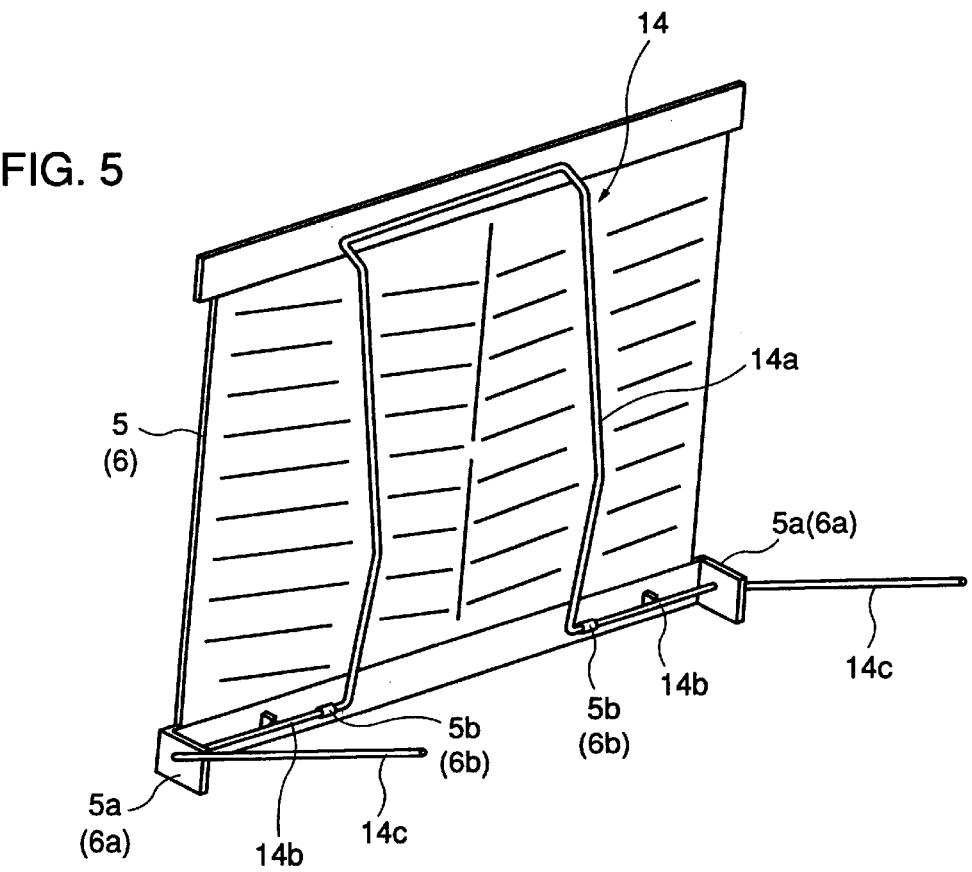
FIG. 5 is a perspective view showing the movable guard attached to a plate heater.

As shown in FIG. 4, the above described movable guard 14 includes: a bread pressing portion 14a generally in a shape of a rectangle with one side opened; two supporting portions 14b laterally extending from two lower ends of bread pressing portion 14a; and adjusting portions 14c upwardly extending from ends of supporting portions 14b. Supporting portions 14b are inclined with respect to, not parallel to, bread pressing portion 14a with a prescribed angle. As shown in FIG. 5, two supporting portions 14b of movable guard 14 are rotatably fixed to fixing members 5a, 5b, 6a and 6b at the inner lower ends of second and third plate heaters 5 and 6. Supporting portions 14b of movable guard 14 are attached to second and third plate heaters 5 and 6 in parallel to bread pressing portion 14a in an elastically deformed state. Thus, the lower end of bread pressing portion 14a is brought into a twisted state, so that a twisting spring force is generated for energizing the upper ends of bread pressing portions 14a to move toward second and third plate heaters 5 and 6.

A pattern plate 15 partially shielding radiation heat from first plate heater 4 is detachably attached to each of fixed guards 13. Pattern plate 15 is in a shape of animal as shown, flower, character, symbol or the like. Pattern plate 15 allows sliced bread B to be browned with a pattern of the shape of pattern plate 15 on one surface thereof.

Now, a method of using the above described toaster A will be described.

First, knob 11 is positioned on the upper side, that is, supporting bars 9 and 10 are elevated to the upper side of bread holding spaces 7 and 8. Then, as shown in FIG. 3A, sliced bread B is inserted into each of slots 2 and 3 for insertion and removal of the sliced bread in case 1, so that sliced bread B is supported by each of supporting bars 9 and 10. By moving down knob 11, supporting bars 9 and 10 are also moved down, so that sliced bread B is held in each of bread holding spaces 7 and 8. The moved down supporting bars 9 and 10 are held at the lower position by a holding mechanism (not shown).

At the time, bread pressing portion 14a of movable guard 14 which is attached to each of second and third plate heaters 5 and 6 is inclined using supporting portion 14b as a supporting point against its own twisting spring force in conjunction with a downward movement of each of supporting bars 9 and 10. Thus, bread pressing portion 14a abuts against one side of sliced bread B for pressing it toward first plate heater 4 in the middle. Then, as shown in FIG. 3B, sliced bread B is placed almost straightly and almost in parallel to first plate heater 4. Thus, sliced bread B is set in each of bread holding spaces 7 and 8, held in parallel to first plate heater 4. In this state, as movable guards 14 are held down by supporting bars 9 and 10, they are kept inclined.

Thereafter, by suitably rotating toasting control knob 12, three plate heaters 4, 5 and 6 are heated for a prescribed period of time by a timer (not shown). Thus, a toasting operation is started for toasting both sides of sliced bread B. As pattern plates 15 are attached on both sides of first plate heater 4 in the middle for shielding radiation heat from first plate heater 4 toward sliced bread B, a region shielded by each of pattern plates 15 on one side of sliced bread B is not browned, whereby only a peripheral region, that is, a region which is not shielded by pattern plate 15, is browned. Thus, a pattern in the shape of pattern plate 15 is formed by browning the peripheral region.

When the timer is terminated and the toasting of sliced bread B is finished, the holding mechanism (not shown) stops the operation of holding supporting bars 9 and 10. Supporting bars 9 and 10 are elevated, so that sliced bread B comes out of each of bread holding spaces 7 and 8. As supporting bars 9 and 10 elevate, the downward pressure by movable guard 14 is eliminated. As a result, bread pressing portions 14a of movable guards 14 are brought back to the sides close to second and third plate heaters 5 and 6 by their own twisting spring force. Now that sliced bread B is totally free in bread holding spaces 7 and 8, it can readily be removed therefrom.

As described above, in toaster A according to the present embodiment, when sliced bread B is held in each of bread holding spaces 7 and 8, it is straightly pressed toward fixed guard 13 on the side of first plate heater 4 with pattern plate 15. As a space between first plate heater 4 and sliced bread B is almost uniform, sliced bread B can be toasted with a fine pattern in the shape of pattern plate 15, and the peripheral portion can uniformly be browned. It is ensured that sliced bread B is not inclined in each of bread holding spaces 7 and 8, but almost straightly held. Thus, the present invention is especially effective when a thickness of sliced bread B is small.

In the above described embodiment, movable guards 14 are attached to second and third plate heaters 5 and 6 in the twisted state to produce the twisting spring force, so that movable guards 14 are brought back to the position close to second and third plate heaters 5 and 6 by their own twisting spring forces when supporting bars 9 and 10 are elevated. Therefore, a separate twisting spring is not necessary for bringing back movable guards 14 to their original positions, whereby the number of parts required is small and the cost is not increased.

In the above described embodiment, as shown in FIG. 3B, a distance between first plate heater 4 and sliced bread B is smaller than that between each of second and third plate heaters 5 and 6 and sliced bread B when sliced bread B is held in each of bread holding spaces 7 and 8. Therefore, if a heating ability of first plate heater 4 and that of second and third plate heaters 5 and 6 are same, or a heating temperature of first plate heater 4 and that of second and third plate heaters 5 and 6 are same, there would be a variation in browning of both sides of sliced bread B. To uniformly brown both sides of sliced bread B, for example, the heating ability of first plate heater 4 is set relatively lower than that of second and third plate heaters 5 and 6, or the heating temperature of first plate heater 4 is set lower than that of second and third plate heaters 5 and 6.

It is noted that the present invention is not limited to the above described embodiment and various applications and variations are possible.

Figure 6:
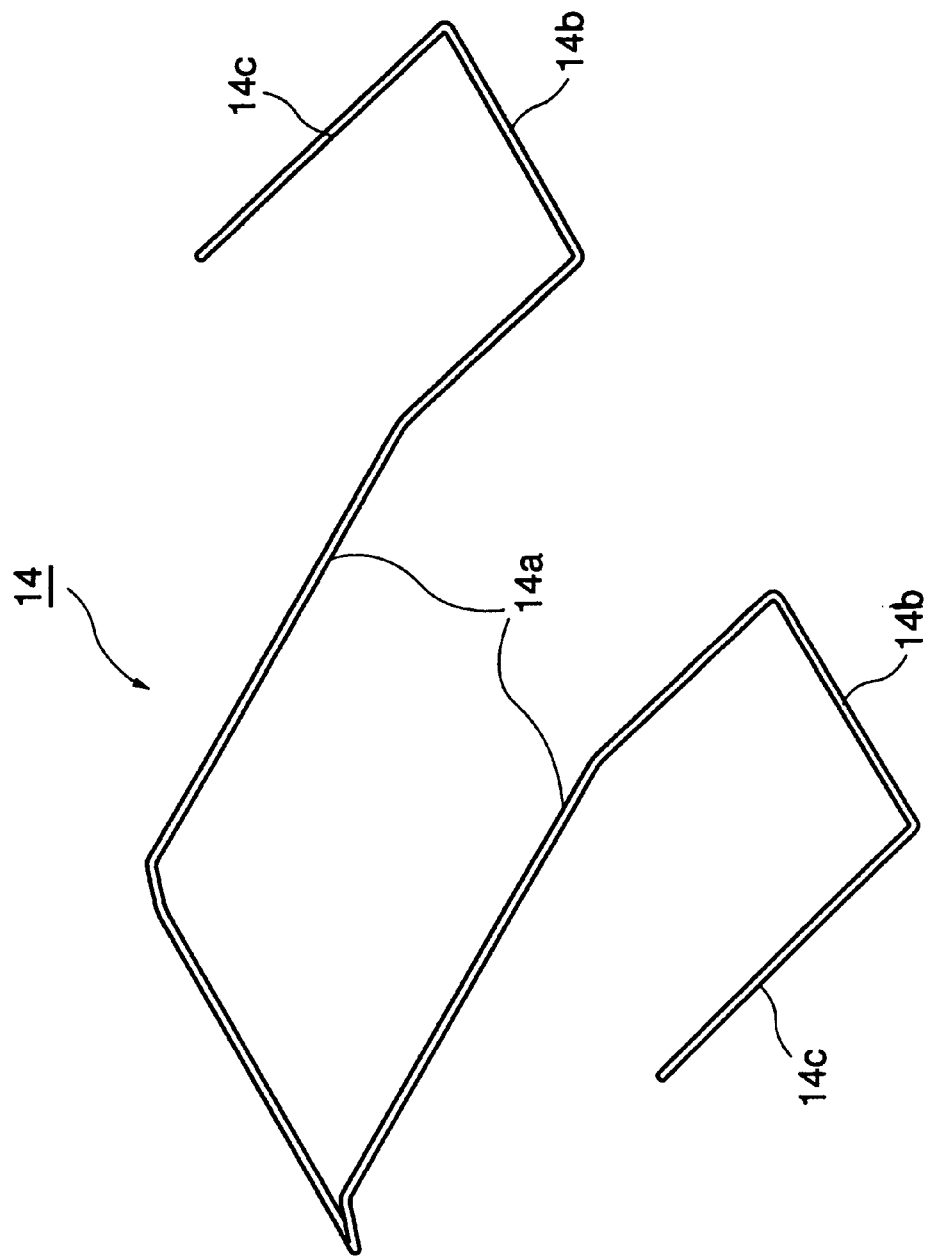
FIG. 6 is a view showing a movable guard according to another embodiment.

(1) In the above described embodiment, although any additional part (for example a twisting spring) is not be used as movable guard can be brought back to its original position by its own twisting spring force, movable guards 14 as shown in FIG. 6 may be used. In the illustrated example, supporting portions 14b of movable guard 14 is formed in parallel to, but not inclined with respect to, bread pressing portion 14a, so that supporting portion 14b is attached to each of second and third plate heaters 5 and 6 in a nontwisted state. Then, a separate twisting spring (not shown) is additionally attached so that a twisting spring force thereof can bring movable guard 14 back to its original position.

Figure 7:
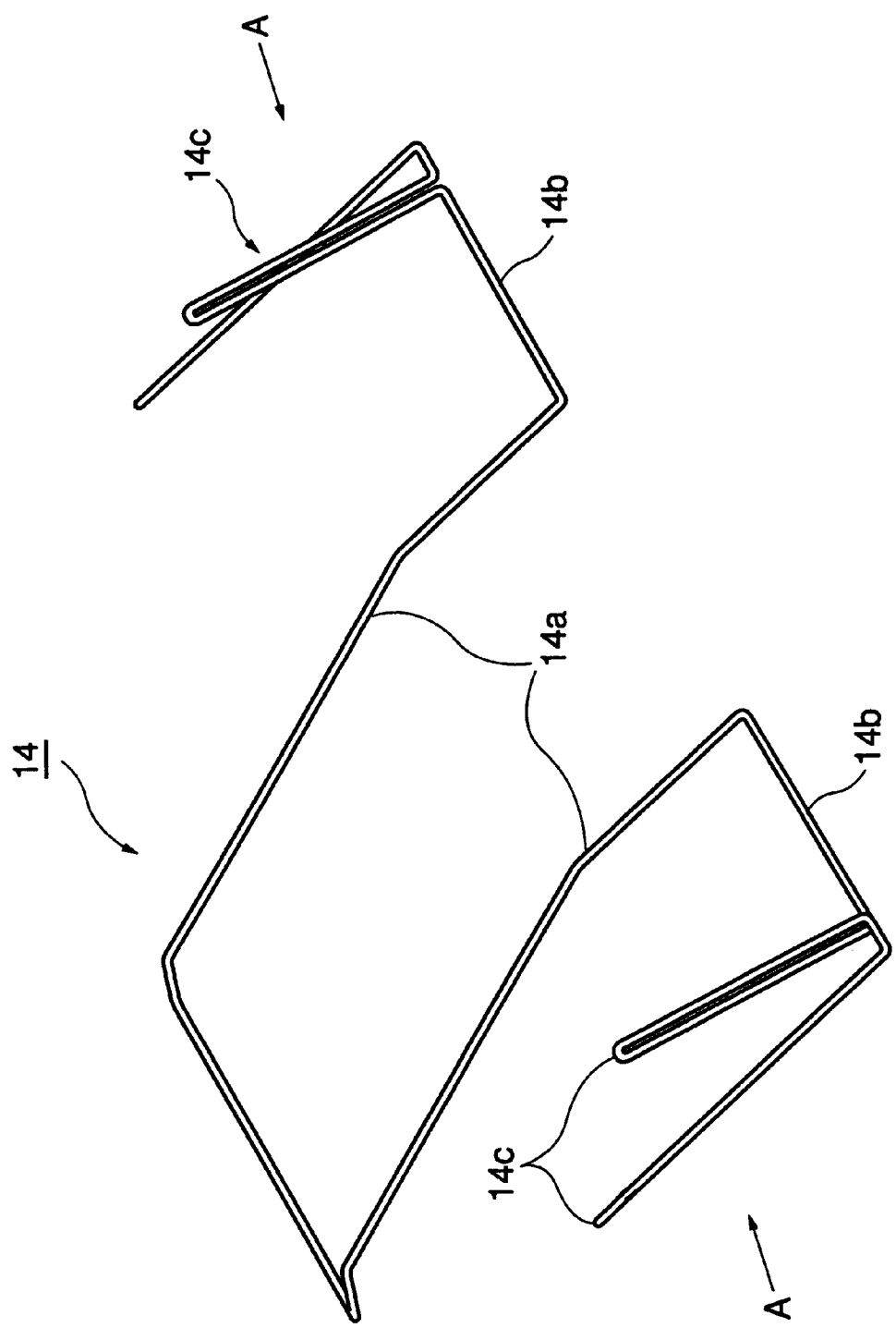
FIG. 7 is a view showing a movable guard according to still another embodiment.
Figure 8:
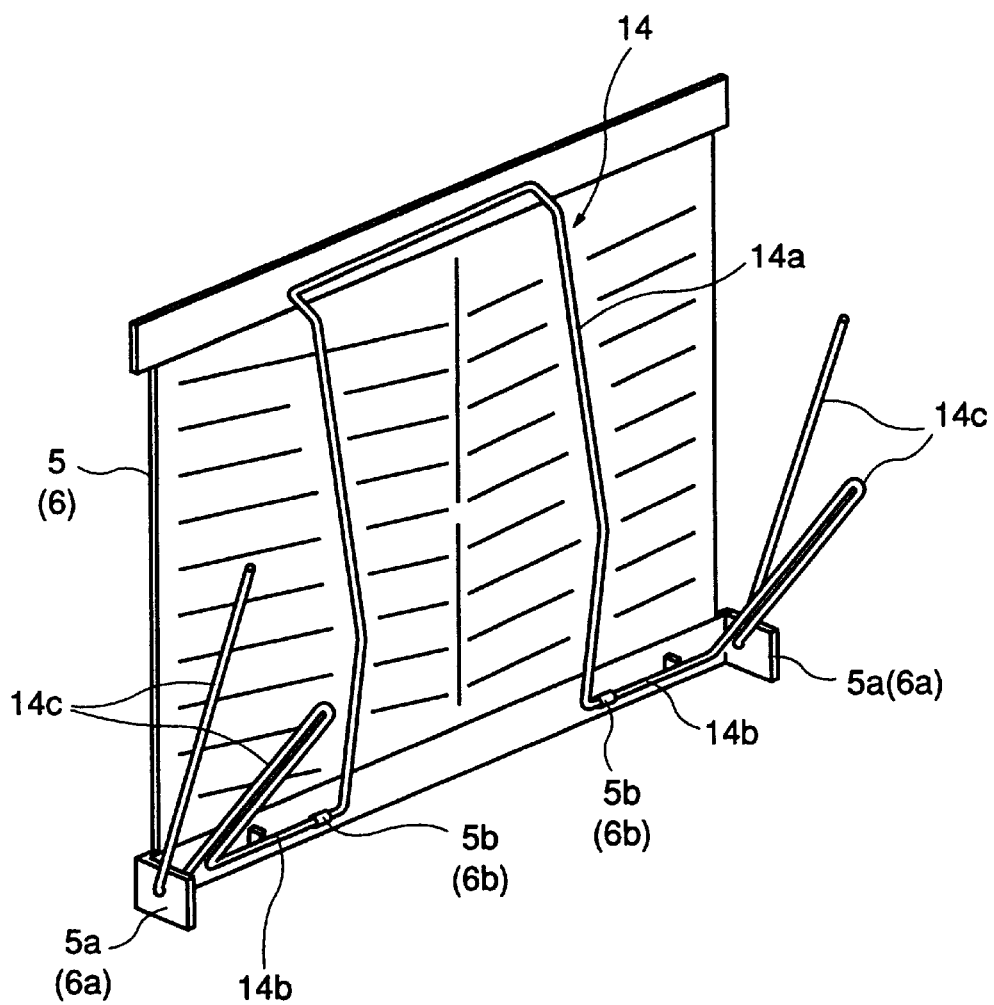
FIG. 8 is a perspective view showing the movable guard attached to a plate heater.
Figure 9A:
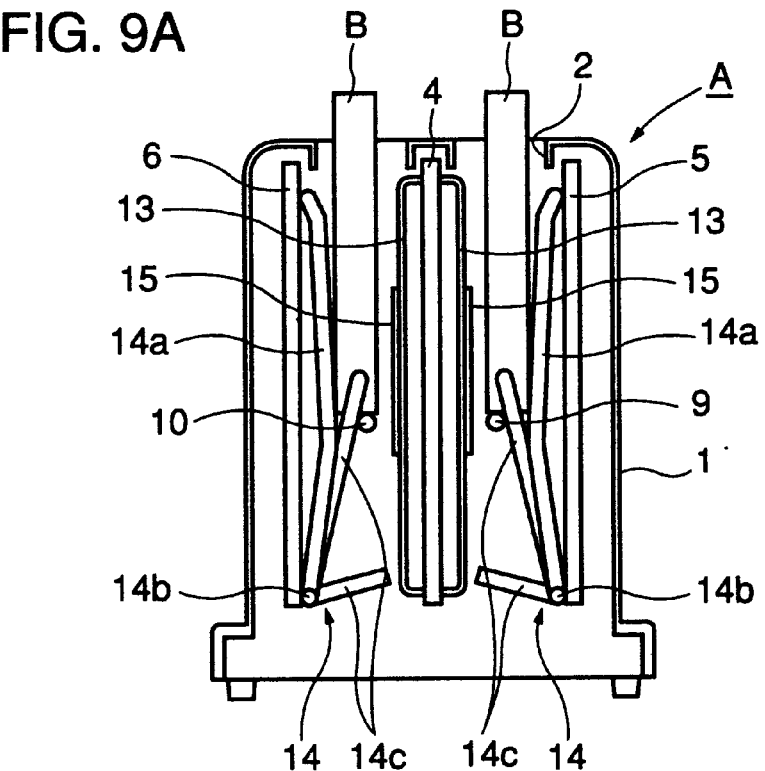
FIGS. 9A and 9B are views corresponding to FIGS. 3A and 3B showing a toaster in which the movable guard is used.
Figure 9B:
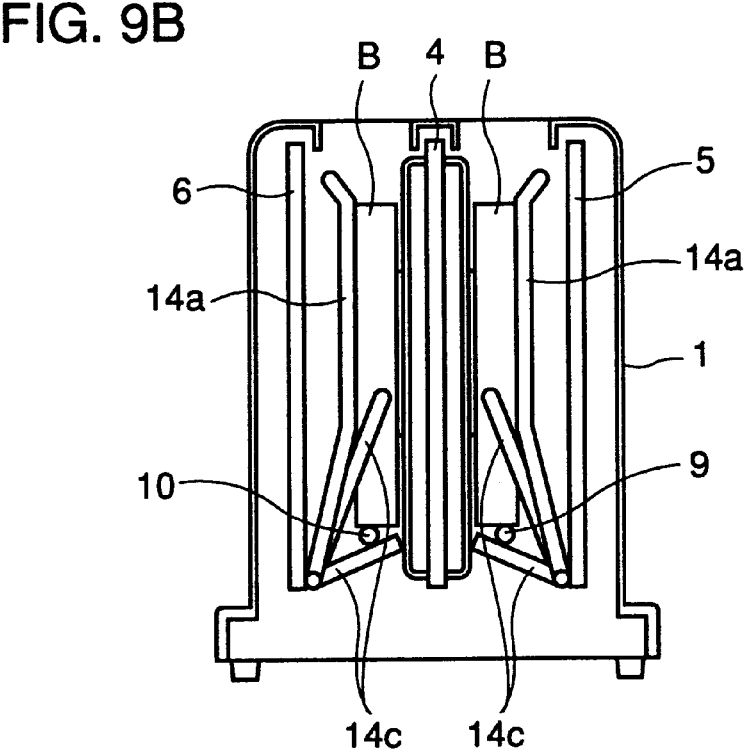

(2) Although any additional part (a twisting spring) is not be used as movable guard 14 is brought back to its original position by its own twisting spring force in the above described embodiment, movable guards 14 as shown in FIG. 7 or FIGS. 9A and 9B may be used. In the illustrated example, movable guard 14 is directly attached to each of second and third plate heaters 5 and 6, not in the twisted state as in the above described embodiment. More specifically, the shapes of adjusting portions 14c of movable guards 14 are bent in a V like shape when seen in a direction indicated by an arrow A to pinch supporting bars 9 and 10. Thus, movable guards 14 are inclined during a downward movement of supporting bars 9 and 10 and elevated by supporting bars 9 and 10 during elevation of supporting bars 9 and 10, so that they are brought back to the position close to the side of second and third plate heaters 5 and 6. As in the above described embodiment, the twisting spring is not necessary.

(3) Although toaster A in which pattern plates 15 are attached to fixed guards 13 is exemplified in the above described embodiment, the present invention may also be applied to a structure in which pattern plates 15 are not attached. Thin sliced bread B can be held in each of bread holding spaces 7 and 8 in a straightly pressed state by movable guard 14, so that sliced bread B can be uniformly browned.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A toaster, comprising:

a case having a slot at a top for insertion and removal of a sliced bread;

at least a pair of plate heaters provided substantially in parallel in said case to form a space for holding said sliced bread;

a supporting member vertically movably provided in said bread holding space between said plate heaters for supporting said sliced bread;

a pressing member, formed as a single wire bent in a prescribed shape which pivots about at least one supporting point at a lower portion of said case with respect to said heater, pressing said sliced bread, in conjunction with a downward movement of said supporting member, toward one of said pair of plate heaters when said sliced bread is supported by said supporting member and held in said bread holding space; and a pattern plate attached to one of said pair of plate heaters opposite to the other of said plate heaters, said pressing member pressing said sliced bread toward said heater with said pattern plate.

2. The toaster according to claim 1, wherein two said supporting points are provided at two portions, said wire forming said pressing member is between said two supporting points and includes an upwardly extending first portion, a second portion engaged with said supporting point and a third portion continuous to said second portion, and said sliced bread is pressed by said first portion.

3. The toaster according to claim 2, wherein said first portion defines a first plane for pressing said sliced bread, and said second portion is on said first plane.

4. The toaster according to claim 3, wherein said heater with said pattern plate has a first heating ability, said heater without said pattern plate has a second heating ability, and said first heating ability is lower than said second heating ability.

5. The toaster according to claim 1, wherein said heater on a side toward which said sliced bread is pressed by said pressing member has a first heating ability, said heater on a side opposite thereto has a second heating ability, and said first heating ability is lower than said second heating ability.

6. A toaster, comprising:

a case having a slot at a top for insertion and removal of a sliced bread;

at least a pair of plate heaters provided substantially in parallel in said case to form a space for holding said sliced bread;

a pattern plate attached to one of said pair of plate heaters opposite to the other of said plate heaters, said pressing member pressing said sliced bread toward said heater with said pattern plate;

a supporting member vertically movably provided in said bread holding space between said plate heaters for supporting said sliced bread; and a pressing member, said pressing member formed of a single wire bent in a prescribed shape which pivots about at least one supporting point at a lower portion of said case with respect to said heater, pressing said sliced bread toward one of said pair of plate heaters when said sliced bread is supported by said supporting member and held in said bread holding space, said pressing member pressing said sliced bread in conjunction with a downward movement of said supporting member, and wherein two said supporting points are provided at two portions, said wire forming said pressing member is between said two supporting points and includes an upwardly extending first portion, a second portion engaged with said supporting point and a third portion continuous to said second portion, and said sliced bread is pressed by said first portion, and said first portion defines a first plane pressing said sliced bread, and said second portion is bent in a direction crossing said first plane and supported by a said supporting point, so that a spring force is generated in said wire for energizing said pressing member to move toward said heater without said pattern plate when said supporting member is at an upper side.

7. The toaster according to claim 6, wherein said heater with said pattern plate has a first heating ability, said heater without said pattern plate has a second heating ability, and said fast heating ability is lower than said second heating ability.

8. The toaster according to claim 7, wherein said wire forming said pressing member is provided in said third portion and further comprises a member for energizing said first portion to move toward a side without said pattern plate when said supporting member is upwardly moved.

9. A toaster, comprising:

a case having a slot for insertion and removal of a sliced bread at a top;

at least a pair of plate heaters spaced apart substantially in parallel to form a bread holding space in said case;

a supporting member vertically movably provided in said bread holding space between said plate heaters for supporting said sliced bread;

a pattern plate attached on an inner side of one of said plate heaters for partially shielding radiation heat from said plate heater; and a pressing member, formed as a single wire bent in a prescribed shape which pivots about at least one supporting point at a lower portion of said case with respect to said heater, pressing the sliced bread toward said plate heater with said pattern plate in conjunction with a downward movement of said supporting member.

10. A toaster, comprising:

a case having a slot for insertion and removal of a sliced bread at a top;

at least a pair of plate heaters spaced apart substantially in parallel to form a bread holding space in said case;

a supporting member vertically movable provided in said bread holding space between said plate heaters for supporting said sliced bread;

guards each provided on an inner side of said plate heater for preventing direct contact of said sliced bread with said inner side of said plate heater; and a pattern plate attached to one of said guards for partially shielding radiation heat from said plate heater on a side of said guard, and wherein the other of said guards is a movable guard, formed as a single wire bent in a prescribed shape which pivots about at least one supporting point at a lower portion of said case with respect to the heater, and inclined using said lower end as a supporting point in conjunction with a downward movement of said supporting member for pressing said sliced bread toward said guard with said pattern plate.

11. A toaster, comprising:

a case having a slot for insertion and removal of a sliced bread at a top;

at least two plate heaters spaced apart substantially in parallel to form a bread holding space in said case;

a supporting member for the sliced bread vertically movably provided in said bread holding space between said plate heaters; and a pair of guards, each provided on an inner side of said plate heater, for preventing direct contact of said sliced bread with said inner side of said plate heater, and wherein at least one of said guards is a single wire bent in a prescribed shape of which a lower end portion is attached to said plate heater as a supporting point in a twisted state, brought close to said corresponding plate heater by a twisting spring force of said single wire when said supporting member is positioned at an upper side, and inclined against said twisting spring force to be close to the other of said guards in conjunction with a downward movement of said supporting member.

12. A toaster, comprising:

a case having a slot for insertion and removal of a sliced bread at a top;

at least a pair of plate heaters spaced apart substantially in parallel to form a bread holding space in said case;

a supporting member vertically movably provided in said bread holding space between said plate heaters for supporting said sliced bread;

guards, each provided on an inner side of said plate heater, for preventing direct contact of said sliced bread with said inner side of said plate heater; and a pattern plate attached to one of said guards for partially shielding radiation heat from said plate heater on a side of said guard, and wherein the other said guards is a movable guard inclined, using a lower end as a supporting point in conjunction with a downward movement of said supporting member, for pressing said sliced bread toward said guard with said pattern plate, said movable guard being a single wire bent in a prescribed shape, attached to said plate heater with its supporting portion in a twisted state, brought to a position close to said corresponding plate heater by a twisting spring force of said single wire when said supporting member is positioned at an upper side, and inclined against said twisting spring force to be close to said guard with said pattern plate in conjunction with said downward operation of said supporting member.

* * * * *